(12) United States Patent
Boskovitch et al.

(10) Patent No.: US 9,937,782 B2
(45) Date of Patent: Apr. 10, 2018

(54) ALL WHEEL DRIVE SYSTEM FOR HYBRID VEHICLE

(71) Applicant: Karma Automotive LLC, Costa Mesa, CA (US)

(72) Inventors: Paul Boskovitch, Costa Mesa, CA (US); Calvin Chunliang Lee, Novi, MI (US)

(73) Assignee: KARMA AUTOMOTIVE LLC, Irvine, CA (US)

( * ) Notice: Subject to any disclaimer, the term of this patent is extended or adjusted under 35 U.S.C. 154(b) by 521 days.

(21) Appl. No.: 13/948,357

(22) Filed: Jul. 23, 2013

(65) Prior Publication Data
US 2014/0054100 A1  Feb. 27, 2014
US 2016/0059687 A9  Mar. 3, 2016

Related U.S. Application Data (63) Continuation-in-part of application No. 13/336,571, filed on Dec. 23, 2011, now Pat. No. 8,602,144, (Continued)

(51) Int. Cl.
*B60K 6/52* (2007.10)
*B60K 6/46* (2007.10)
(Continued)

(52) U.S. Cl.
CPC .............. *B60K 6/52* (2013.01); *B60K 1/02* (2013.01); *B60K 6/46* (2013.01); *B60K 17/356* (2013.01);
(Continued)

(58) Field of Classification Search
CPC ... B60K 6/52; B60K 1/02; B60K 6/46; B60K 17/356; B60K 23/08; B60L 7/14;
(Continued)

(56) References Cited

U.S. PATENT DOCUMENTS 6,691,809 B2 * 2/2004 Hata ..................... B60K 6/44
                                                        180/65.225
6,988,779 B2   1/2006  Amanuma et al.
(Continued)

FOREIGN PATENT DOCUMENTS

JP   2010-052552 A   3/2000
JP   2009-292193 A   12/2009
(Continued)

OTHER PUBLICATIONS

International Search Report dated Oct. 23, 2013, from related International Patent Application No. PCT/US2013/051625, 3 pages.

*Primary Examiner* — Jacob D Knutson
(74) *Attorney, Agent, or Firm* — Farjami & Farjami LLP (57) ABSTRACT

There is provided a vehicle having a drive system. The drive system includes an engine for providing electrical power for propelling the vehicle, an electrical energy storage device, a first motor for driving a rotation of a first shaft of the vehicle, and a second motor for driving a rotation of a second shaft of the vehicle. The drive system is configured to operate in a first mode, wherein in the first mode, power for each of the first motor and the second motor is provided exclusively by the electrical energy storage device.

9 Claims, 7 Drawing Sheets

Related U.S. Application Data which is a continuation of application No. PCT/US2010/040004, filed on Jun. 25, 2010.

(60) Provisional application No. 61/675,647, filed on Jul. 25, 2012, provisional application No. 61/220,421, filed on Jun. 25, 2009, provisional application No. 61/288,709, filed on Dec. 21, 2009, provisional application No. 61/294,722, filed on Jan. 13, 2010.

(51) Int. Cl.
| | | |
|---|---|---|
| *B60K 1/02* | (2006.01) | |
| *B60K 17/356* | (2006.01) | |
| *B60K 23/08* | (2006.01) | |
| *B60L 7/14* | (2006.01) | |
| *B60L 11/12* | (2006.01) | |
| *B60L 11/14* | (2006.01) | |
| *B60L 15/20* | (2006.01) | |

(52) U.S. Cl.
CPC ............... *B60K 23/08* (2013.01); *B60L 7/14* (2013.01); *B60L 11/123* (2013.01); *B60L 11/14* (2013.01); *B60L 15/2009* (2013.01); *B60L 15/2054* (2013.01); *B60L 2210/40* (2013.01); *B60L 2240/12* (2013.01); *B60L 2240/421* (2013.01); *B60L 2240/423* (2013.01); *B60L 2240/463* (2013.01); *B60L 2240/486* (2013.01); *B60L 2240/507* (2013.01); *B60L 2260/28* (2013.01); *Y02T 10/6217* (2013.01); *Y02T 10/645* (2013.01); *Y02T 10/7077* (2013.01); *Y02T 10/7241* (2013.01); *Y02T 10/7275* (2013.01); *Y10S 903/903* (2013.01)

(58) Field of Classification Search
CPC .... B60L 11/123; B60L 11/14; B60L 15/2009; B60L 15/2054
USPC ...... 180/242, 65.245, 65.22, 65.265, 65.275; 318/139, 140; 307/10.1; 74/661; 903/903
See application file for complete search history.

(56) References Cited

U.S. PATENT DOCUMENTS

| | | | |
|---|---|---|---|
| 2006/0011395 A1* | 1/2006 | Sugiyama | B60K 6/365 180/65.235 |
| 2007/0066432 A1* | 3/2007 | Schmidt | B60K 6/365 475/5 |
| 2008/0277182 A1* | 11/2008 | Heindl | B60K 17/105 180/242 |
| 2010/0181125 A1* | 7/2010 | Wang et al. | 180/65.22 |

FOREIGN PATENT DOCUMENTS

| | | |
|---|---|---|
| JP | 2010-193548 A | 9/2010 |
| WO | WO-2008/077345 A1 | 7/2008 |
| WO | WO 2010151775 A1 * | 12/2010 |

\* cited by examiner

ALL WHEEL DRIVE SYSTEM FOR HYBRID VEHICLE

CROSS REFERENCE TO RELATED APPLICATIONS

This application claims priority to and the benefit of U.S. Provisional Patent Application No. 61/675,647, entitled "All Wheel Drive System for a Serial PHEV" and filed on Jul. 25, 2012. This application is a Continuation-in-Part of U.S. patent application Ser.No. application Ser. No. 13/336,571, filed Dec. 23, 2011 (now U.S. Pat. No. 8,602,144), which is a Continuation of PCT Application Ser. No. PCT/US2010/040004, filed Jun. 25, 2010, which claims priority to and the benefit of U.S. Provisional Application No. 61/220,421, filed on Jun. 25, 2009, U.S. Provisional Application No. 61/288,709, filed on Dec. 21, 2009, and U.S. Provisional Application No. 61/294,722, filed on Jan. 13, 2010.

BACKGROUND

This application relates generally to hybrid or electric vehicles, and particularly to a plurality of operating modes associated with hybrid or electric vehicles.

Vehicles, such as motor vehicles, utilize an energy source in order to provide power to operate the vehicle. While petroleum-based products, such as gasoline, dominate as an energy source in traditional combustion engines, alternative energy sources are available, such as methanol, ethanol, natural gas, hydrogen, electricity, solar, and/or the like. A hybrid powered vehicle, referred to as a "hybrid vehicle," utilizes a combination of energy sources in order to power the vehicle. For example, a battery maybe utilized in combination with the traditional combustion engine to provide power to operate the vehicle. Such vehicles are desirable because they take advantage of the benefits of multiple fuel sources in order to enhance performance and range characteristics of the hybrid vehicle relative to a comparable gasoline-powered vehicle.

An example of a hybrid vehicle is a vehicle that utilizes a combination of stored electric energy and an internal combustion engine as power sources to propel the vehicle. An electric vehicle is environmentally advantageous due to its low emissions characteristics and the general availability of electricity as a power source. The battery may be quite large, depending on the energy requirements of the vehicle, and will generate heat that is dissipated using various techniques. Batteries can be quiet emitting low sound. Adjustment between a supplemental energy source, like an engine, can be improved to provide desired vehicle performance characteristics.

DETAILED DESCRIPTION

Figure 1:
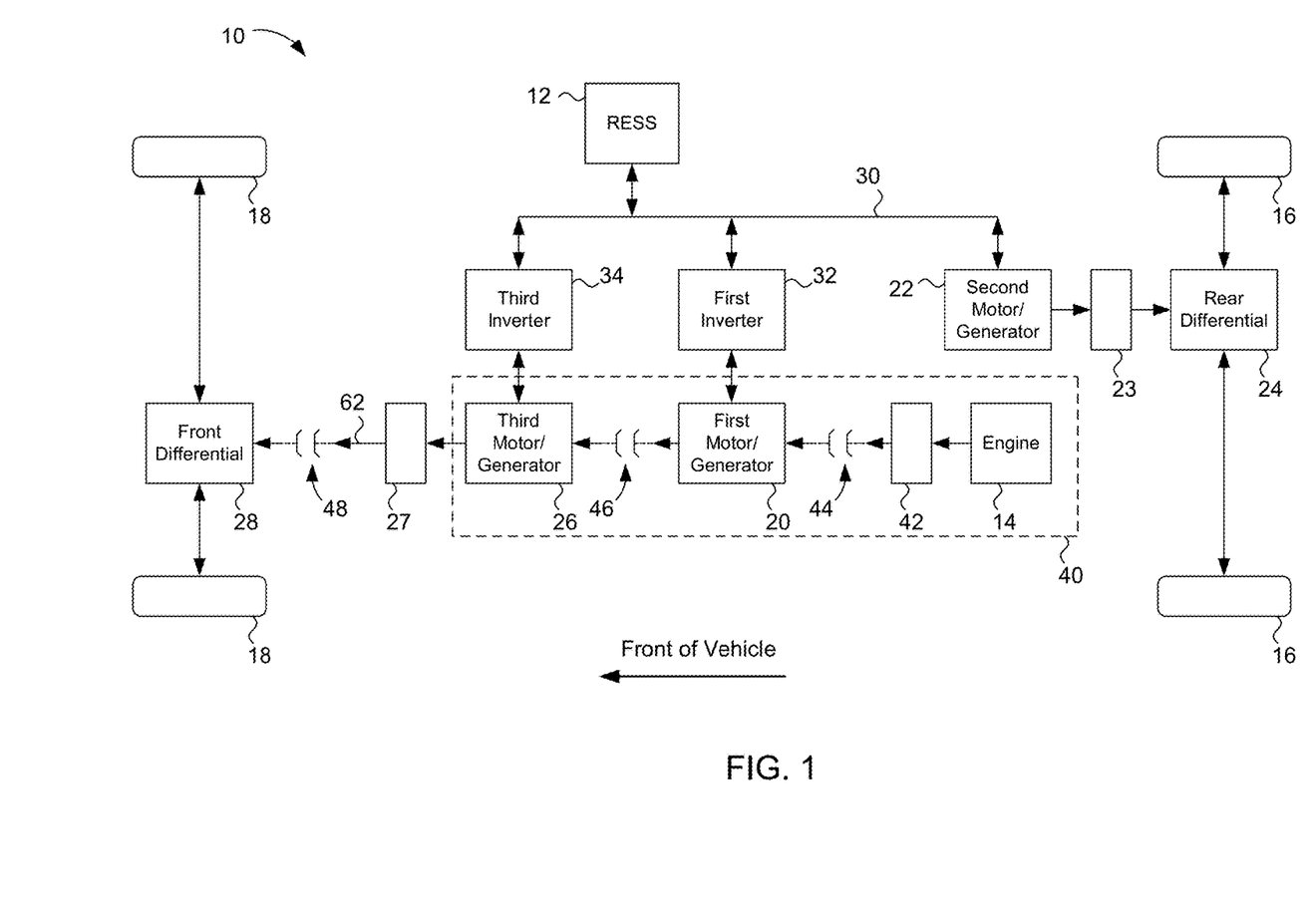
FIG. 1 is a schematic block diagram of a vehicle drive system in accordance with various embodiments of the disclosure.

Referring to FIG. 1, a vehicle, such as a hybrid vehicle 10, includes a rechargeable energy storage system (RESS) 12 coupled to an engine 14. The engine 14 may generally refer to any apparatus operable to augment power or range beyond the RESS 12. For example, the engine 14 can be an internal combustion engine that consumes gasoline. The RESS 12 can be, for example (but not limited to) a high-voltage battery, such as a high-voltage lithium ion battery pack. Operation of the vehicle 10 can be driven by each power source and/or both. The vehicle 10 may include multiple electrical motor/generators that may be operated either as drive motors that convert electrical power to rotational mechanical energy or as generators that convert rotational mechanical energy to electrical energy. The motor/generators are at times referred to simply as motors but, as described herein, include the ability to be driven to generate electricity. The motor/generators can be electrically driven and coupled to the engine 14 and the RESS 12.

According to various embodiments, the vehicle 10 includes a first motor/generator 20 that primarily serves as a generator. The vehicle 10 further includes a second motor/generator 22 (e.g., rear wheel drive (RWD) motor) that engages a drive shaft that turns one or more rear wheels 16. One or more intermediate devices, such as a rear gearbox 23 and a rear differential 24, may be provided between the second motor/generator 22 and the rear wheels 16. The vehicle 10 still further includes a third motor/generator 26 (e.g., all wheel drive (AWD) motor) that engages a drive shaft that turns one or more front wheels 18. One or more intermediate devices, such as a front gearbox 27 and a front differential 28, may be provided between the third motor/generator 26 and the front wheels 18. The gearboxes 23 and 27 may be single speed gearboxes or multi-speed gearboxes. The motor/generators 20, 22, and 26 and the RESS 12 may be coupled to a common DC bus 30. In some embodiments, the first motor/generator 20 and the third motor/generator 26 may be AC devices and electric conversion devices such as inverters 32 and 34 may be coupled between the motor generators 20 and 26 and the DC bus 30. The vehicle 10 may be operated normally as a RWD vehicle, with the front wheels 18 only powered when needed for additional power or traction.

When the vehicle accelerates or increases energy consumption, speed of the drive motors (e.g., motor/generators 22 and 26) increase to deliver more power or energy to the rear wheels 16 and/or the front wheels 18. The turning of the motors can be reversed to provide regenerative braking, which provides the impression of down-shifting the vehicle 10. This also generates energy that can be stored in the RESS 12. Accordingly, in some embodiments, the vehicle 10 can actuate regenerative braking to slow the vehicle 10 rather than causing brake pads (not shown) to slow the wheels 16 and 18 when a brake pedal of the vehicle is depressed. To slow the vehicle 10 beyond the speed caused by the regenerative braking, the brake pads can engage the wheels 16 and 18 under predetermined circumstances that are input into a controller of the vehicle (not shown). For instance, the brake pads can take over once requested braking surpasses a prefixed set point or threshold.

Various embodiments provide for one or more driver-selectable powertrain operating modes for a vehicle such as a hybrid vehicle. The modes may also be automatically engaged according to predetermined criteria such as, for example, vehicle or vehicle component operating conditions. The operation of the various systems and components thereof that are described herein may be controlled via one or more processors, controllers or computers such as, for example, the vehicle controller mentioned above. In some embodiments, a first mode or "stealth" mode is a default operating mode for the vehicle 10. In stealth mode, fuel economy can be favored over performance. To favor fuel economy, the vehicle 10 is powered by the RESS 12 (e.g., high-voltage battery) with little or no supplemental power from the engine 14. The RESS 12 is used to operate the vehicle 10 until the RESS 12 reaches a state of charge threshold. The state of charge threshold may be predetermined and programmed into a controller of the vehicle 10 (not shown). The state of charge threshold may be targeted to maintain battery longevity and performance targets. In stealth mode, the vehicle controller is programmed to prevent operation of the engine 14 until the RESS 12 reaches its target state of charge threshold.

A second mode or "sport" mode can be a selectable mode that emphasizes performance aspects of the vehicle 10 by allowing for operation of the engine 14 to provide additional power to the RESS 12 as compared to stealth mode. In an example, the driver can switch to sport mode and back to stealth via a device such as a bidirectional push/pull sport hand paddle on a steering wheel. In the sport mode, the vehicle 10 uses more than one power source (e.g., the RESS 12 and the engine 14) to achieve performance targets. The engine 14 may still turn off when the driver does not demand substantial power, but without significantly sacrificing response time. Sport mode can affect various systems of the vehicle 10 as well, but with the target of creating a performance-oriented driving experience.

Referring now in general to FIGS. 2-5, the engine 14 may be combined with one or more of the motor/generators to form a relatively compact engine assembly 40. The engine assembly 40 can provide advantages in package size and cost compared to a vehicle drive system with a separate engine/generator and AWD systems. According to various embodiments, the engine assembly 40 includes the engine 14, the first motor/generator 20, and the third motor/generator 26, which are coupled together on concentric shafts that are able to rotate independently of each other. The engine assembly 40 further includes a planetary gear set 42 coupled to the output shaft of the engine 14. A first clutch 44 is coupled between the gear set 42 and the first motor/generator 20. A second clutch 46 is coupled between the first motor/generator 20 and the third motor/generator. A third clutch 48 is coupled between the front gearbox 27 and the front differential 28. Through the selective engagement and disengagement of the clutches 44, 46, and 48, the engine 14, the first motor/generator 20, and the third motor/generator 26 may be operated independently or may coupled together to achieve a variety of vehicle drive system modes of operation.

Figure 2:
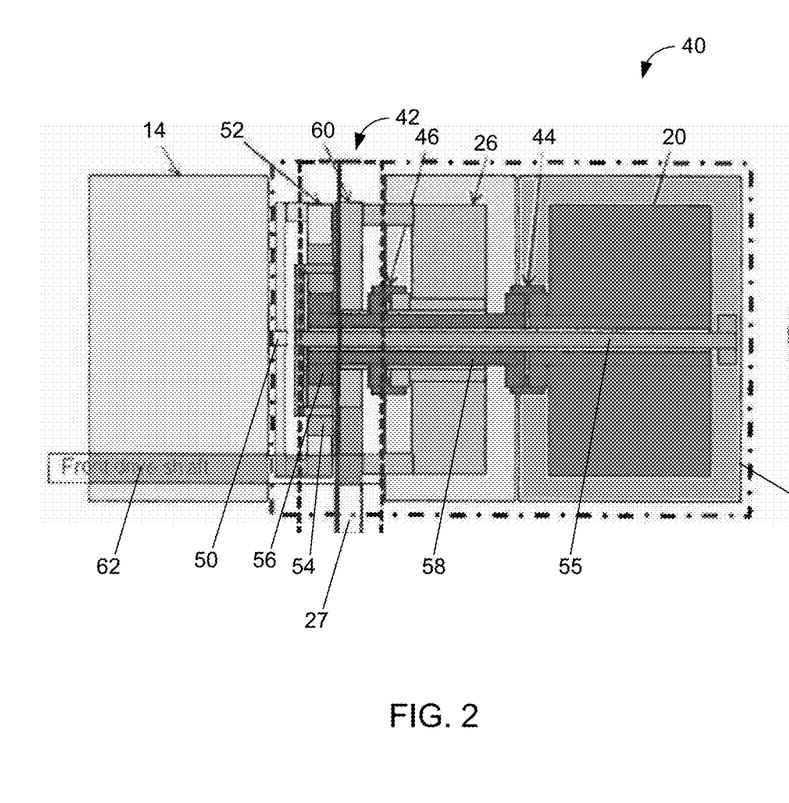
FIG. 2 is a schematic cross-section view of an engine assembly in accordance with various embodiments of the disclosure.
Figure 3:
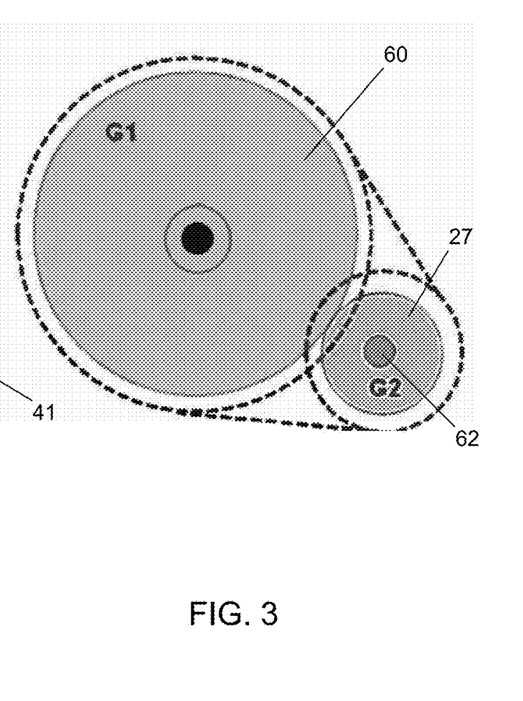
FIG. 3 is a schematic end view of two gears of a front gear box coupled to an engine assembly in accordance with various embodiments of the disclosure.

In some embodiments, the engine assembly 40 includes the engine 14 on a first end of the engine assembly 40, the first motor/generator 20 on a second end of the second end of the engine assembly 40, and the third motor/generator 26 between the engine 14 and the first motor/generator 20. The planetary gear set 42 is provided between the engine 14 and the third motor/generator 26. An engine output shaft 50 (e.g., crankshaft) is coupled to a ring gear 52 of the planetary gear set 42. A planet carrier 54 of the planetary gear set 42 is fixed to a housing 41 of the engine assembly 40 via a shaft 55 that is concentric with the engine output shaft 50 and extends through the third motor/generator 26 and the first motor/generator 20. A sun gear 56 of the planetary gear set 42 is coupled to a shaft 58 that is concentric with the engine output shaft 50 and the shaft 55. The shaft 58 is a hollow shaft that surrounds a portion of the length of the shaft 55 and extends through the third motor/generator 26. The shaft 58 can be coupled to the first motor/generator 20 with the first clutch 44. The shaft 58 can be coupled to the third motor/generator 26 with the second clutch 46. In particular embodiments, the third motor/generator 26 is permanently coupled to a power pickup gear 60 that engages the gearbox 27. The gearbox 27 drives a front drive shaft 62, which may be coupled to the front differential 28 with the third clutch 48.

Figures 4, 5:
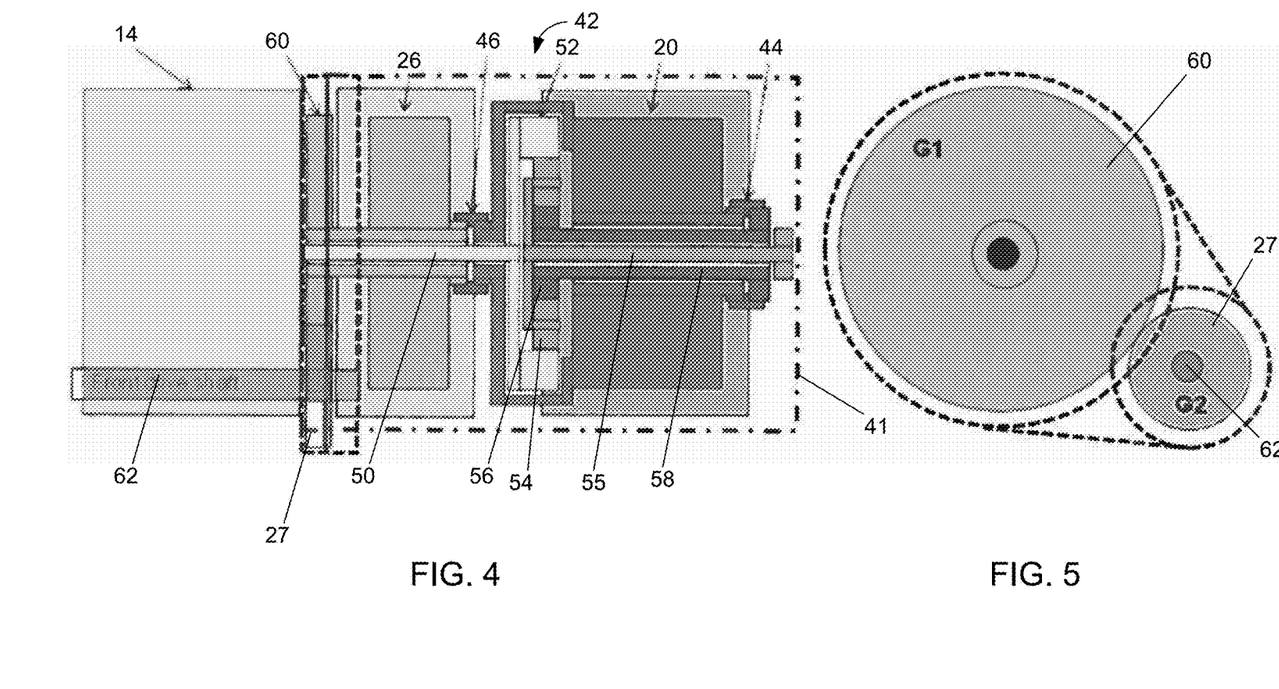
FIG. 4 is a schematic cross-section view of an engine assembly in accordance with various embodiments of the disclosure.
FIG. 5 is a schematic end view of two gears of a front gear box coupled to an engine assembly in accordance with various embodiments of the disclosure.

In some embodiments, the engine assembly 40 includes the engine 14 on a first end of the engine assembly 40, the first motor/generator 20 on a second end of the second end of the engine assembly 40, and the third motor/generator 26 between the engine 14 and the first motor/generator 20. The planetary gear set 42 is provided between the third motor/generator 26 and the first motor/generator 20. The engine output shaft 50 (e.g., crankshaft) extends through the third motor/generator 26 and is coupled to the ring gear 52 of the planetary gear set 42. The planet carrier 54 of the planetary gear set 42 is fixed to the housing 41 of the engine assembly 40 via a shaft 55 that is concentric with the engine output shaft 50 and extends through the first motor/generator 20. The sun gear 56 of the planetary gear set 42 is coupled to the shaft 58 that is concentric with the engine output shaft 50 and the planet carrier shaft 55. The shaft 58 is a hollow shaft that extends through the first motor/generator 20 and surrounds the shaft 55. The shaft 58 can be coupled to the first motor/generator 20 with the first clutch 44. The first motor/generator 20 can be coupled to the third motor/generator 26 with the second clutch 46. In particular embodiments, the third motor/generator 26 is permanently coupled to a power pickup gear 60 that engages the gearbox 27. The gearbox 27 drives the front drive shaft 62, which may be coupled to the front differential 28 with the third clutch 48.

The planetary gear set 42 and the clutches 44, 46, and 48 may be configured to enable an ideal speed ratio between the components of the engine assembly 40 and allow the engine 14, the first motor/generator 20, and the third motor/generator 26 to each be operated at their respective optimal efficiency regions.

With reference to FIGS. 6-12, in various embodiments, several operational modes of the drive system for the vehicle 10 are shown. The vehicle 10 may be a rear wheel drive vehicle with the second motor/generator 22 being utilized to drive the rear wheels 16 in any of the operational modes and the modes may be differentiated by the used of the engine 14, the first motor/generator 20, and the third motor/generator 26. For clarity, the drive system of the vehicle 10 is simplified and does not show the gearboxes 23 and 27; the differentials 24 and 28; the inverters 30, 32, and 34; or the planetary gear set 42. Any stealth mode or rear wheel drive mode described in the disclosure (e.g., the modes shown in FIGS. 6-10) may operate in either to propel the vehicle forward or in reverse.

Figure 6:
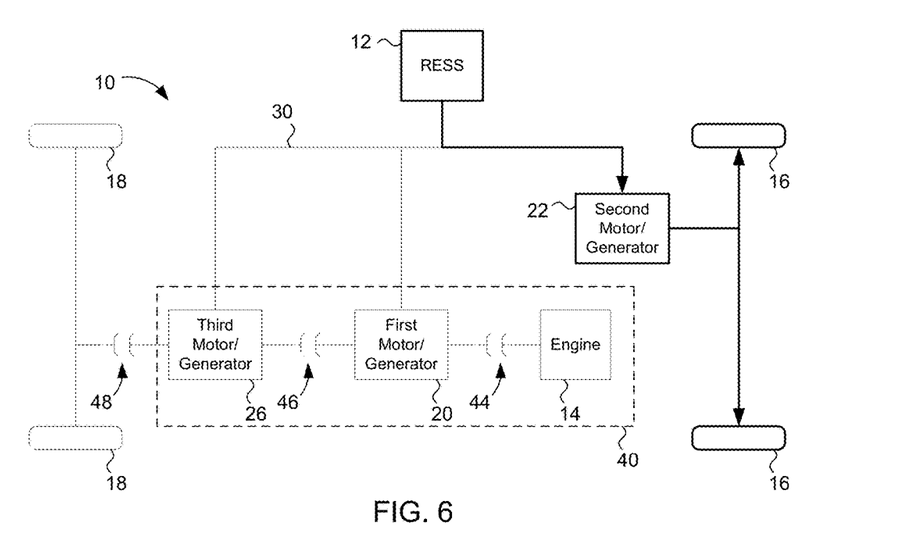
FIG. 6 is a schematic block diagram of a vehicle drive system operating in a rear wheel drive mode according to an exemplary embodiment.

Referring to FIG. 6, in a first mode or RWD stealth mode, the engine 14, the first motor/generator 20, and the third motor/generator 26 are each turned off The first clutch 44 and the second clutch 46 may be engaged or disengaged without affecting the drive system. The second motor/generator 22 draws electrical power from the DC bus 30 to drive the rear wheels 16. The third clutch 48 is disengaged, allowing the front wheels 18 to rotate freely.

Figure 7:
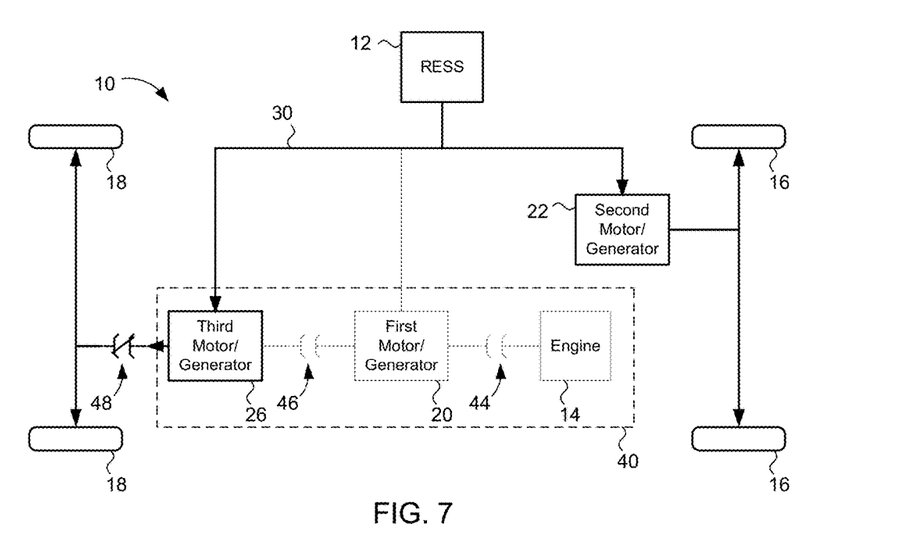
FIG. 7 is a schematic block diagram of a vehicle drive system operating in a rear wheel drive mode according to an exemplary embodiment.

Referring to FIG. 7, in a second mode or AWD stealth mode, each of the engine 14 and the first motor/generator 20 is turned off and the third motor/generator 26 is operated as a motor. The first clutch 44 may be engaged or disengaged without affecting the drive system. The second clutch 46 is disengaged to decouple the third motor/generator 26 from the first motor/generator 20. The third clutch 48 is engaged to couple the third motor/generator 26 to the front wheels 18. The third motor/generator 26 draws electrical power from the DC bus 30 to drive the front wheels 18. The second motor/generator 22 draws electrical power from the DC bus 30 to drive the rear wheels 16. The AWD stealth mode allows both the front wheels 18 and rear wheels 16 to be driven solely on electrical power without turning on the engine 14.

Figure 8:
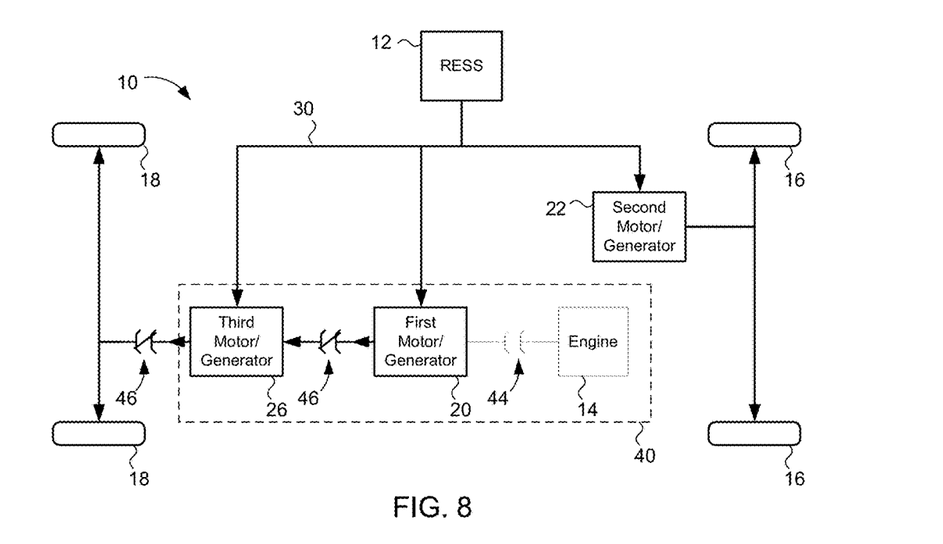
FIG. 8 is a schematic block diagram of a vehicle drive system operating in all wheel drive mode according to an exemplary embodiment.

Referring to FIG. 8, in a third mode or AWD stealth max mode, the engine 14 is turned off and the first motor/generator 20 and the third motor/generator 26 are both operated as motors. The first clutch 44 is disengaged to decouple the engine 14 from the first motor/generator 20. The second clutch 46 is engaged to couple the third motor/generator 26 to the first motor/generator 20. The third clutch 48 is engaged to couple the third motor/generator 26 to the front wheels 18. The first motor/generator 20 and the third motor/generator 26 draw electrical power from the DC bus 30 to drive the front wheels 18. The second motor/generator 22 draws electrical power from the DC bus 30 to drive the rear wheels 16. The AWD stealth max mode allows both the front wheels 18 and rear wheels 16 to be driven solely on electrical power without turning on the engine 14 and provides maximum torque to the front wheels 18 through the use of both the first motor/generator 20 and the third motor/generator 26 as motors.

Figure 9:
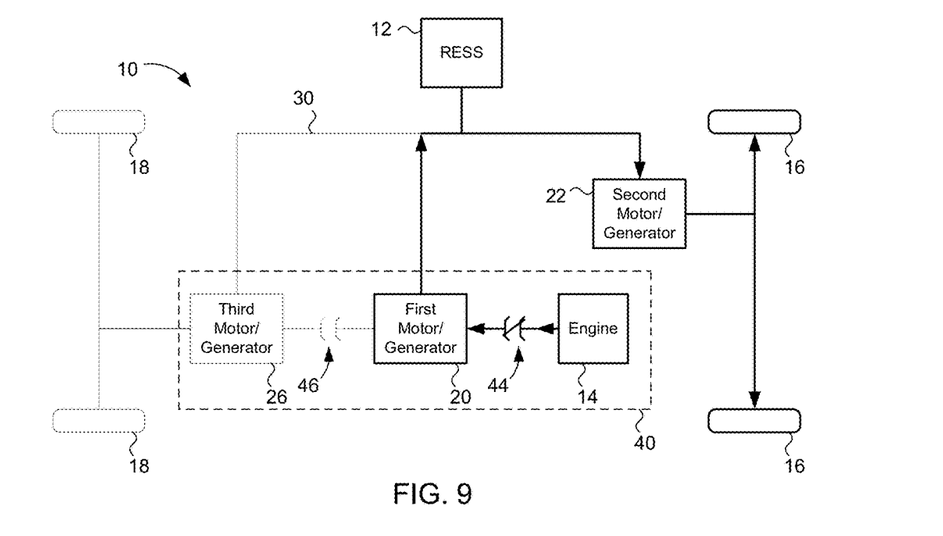
FIG. 9 is a schematic block diagram of a vehicle drive system operating in a rear wheel drive according to an exemplary embodiment.

Referring to FIG. 9, in a fourth mode or RWD charge mode, the engine 14 is turned on, the first motor/generator 20 is operated as a generator, and the third motor/generator 26 is turned off. The first clutch 44 is engaged to couple the engine 14 to the first motor/generator 20. The second clutch 46 is disengaged to decouple the third motor/generator 26 from the first motor/generator 20. The third clutch 48 is disengaged, allowing the front wheels 18 to rotate freely. The first motor/generator 20 is operated as a generator and converts mechanical power from the engine 14 to recharge the RESS 12 via the DC bus 30. The second motor/generator 22 draws electrical power from the DC bus 30 to drive the rear wheels 16. The RWD charge mode allows the vehicle 10 to travel an extended range by using an onboard fuel source such as a gas tank to provide additional electrical power beyond the capacity of the RESS 12 (e.g., the charge stored in the RESS 12 before departure of the vehicle 10, such as by being plugged into a source such as the electrical power grid).

Figure 10:
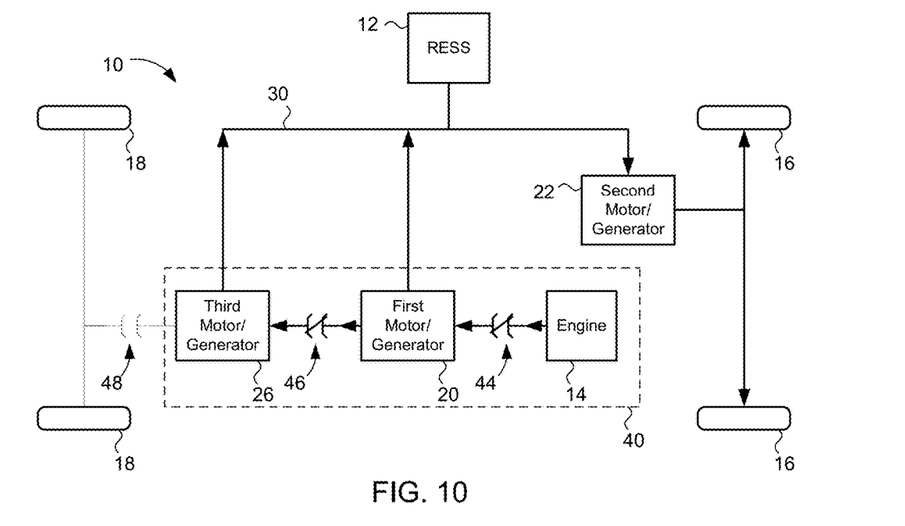
FIG. 10 is a schematic block diagram of a vehicle drive system operating in a rear wheel drive according to an exemplary embodiment.

Referring to FIG. 10, in a fifth mode or RWD charge sustain/sport max mode, the engine 14 is turned on and the first motor/generator 20 and the third motor/generator 26 are operated as generators. The first clutch 44 is engaged to couple the engine 14 to the first motor/generator 20 and the second clutch 46 is engaged to couple the third motor/generator 26 to the first motor/generator 20. The third clutch 48 is disengaged, allowing the front wheels 18 to rotate freely. The first motor/generator 20 and the third motor/generator 26 are both operated as generators and convert mechanical power from the engine 14 to recharge the RESS 12 via the DC bus 30. The second motor/generator 22 draws electrical power from the RESS 12 to drive the rear wheels 16. The RWD charge sustain/sport max mode allows the vehicle 10 to travel an extended range by using an onboard fuel source, such as a gas tank, to recharge the RESS 12 and provides maximum electrical power to the second motor/generator 22 through the use of both the first motor/generator 20 and the third motor/generator 26 as generators.

Figure 11:
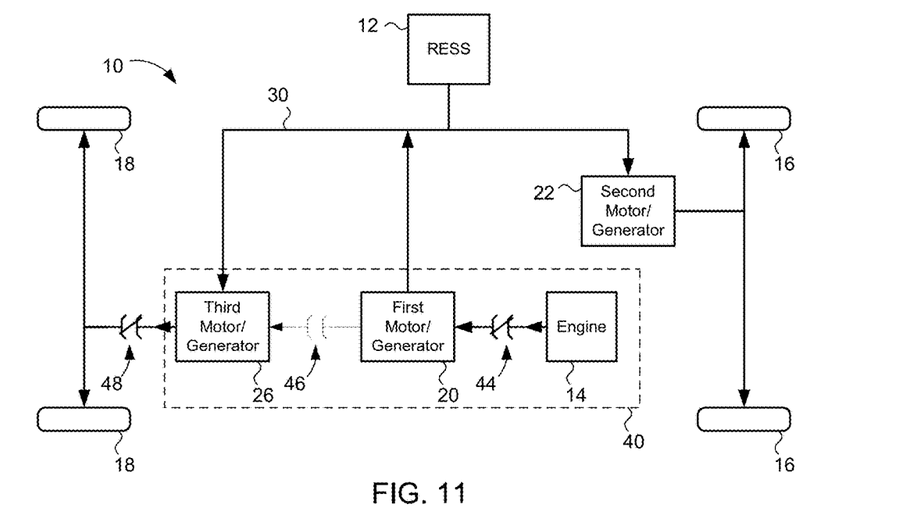
FIG. 11 is a schematic block diagram of a vehicle drive system operating in all wheel drive mode according to an exemplary embodiment.

Referring to FIG. 11, in a sixth mode or AWD charge sustain/sport mode, the engine 14 is turned on, the first motor/generator 20 is operated as a generator, and the third motor/generator 26 is operated as a motor. The first clutch 44 is engaged to couple the engine 14 to the first motor/generator 20 and the third clutch 48 is engaged to couple the third motor/generator 26 to the front wheels 18. The second clutch 46 is disengaged to decouple the third motor/generator 26 from the first motor/generator 20. The first motor/generator 20 is operated as a generator and converts mechanical power from the engine 14 to recharge the RESS 12 via the DC bus 30. The third motor/generator 26 is operated as a motor and draws electrical power from the DC bus 30 to drive the front wheels 18. The second motor/generator 22 draws electrical power from the DC bus 30 to drive the rear wheels 16. The AWD charge sustain/sport mode allows the vehicle 10 to travel an extended range by using an onboard fuel source, such as a gas tank, to recharge the RESS 12 and allows both the front wheels 18 and rear wheels 16 to be driven solely on electrical power. The charge sustain/sport max modes (both RWD and AWD) can be configured to maintain the battery charge level above a predetermined (e.g., 70 percent of total capacity).

Figure 12:
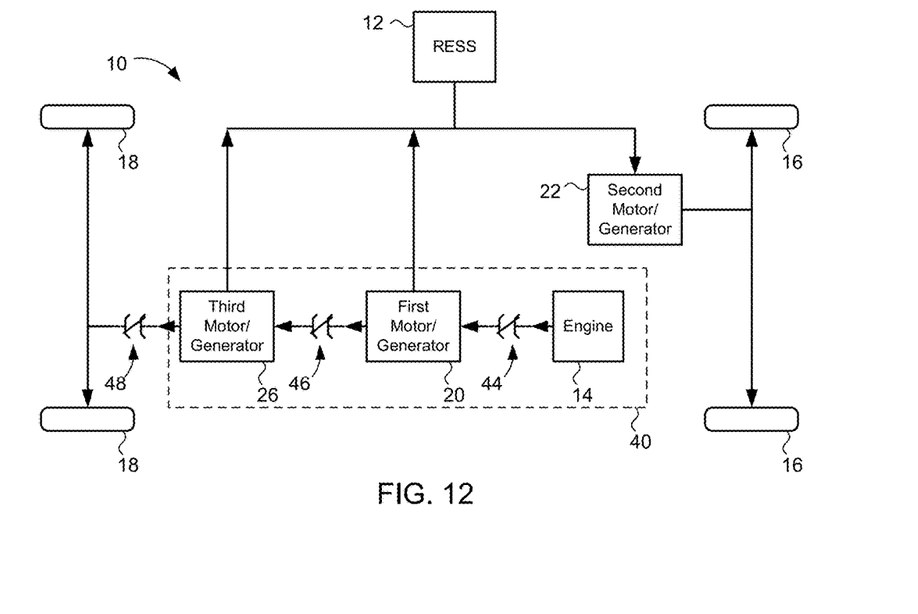
FIG. 12 is a schematic block diagram of a vehicle drive system operating in all wheel drive mode according to an exemplary embodiment.

Referring to FIG. 12, in a seventh mode or power split mode, the engine 14 is turned on, and the first motor/generator 20 and the third motor/generator 26 are both operated as generators. The first clutch 44 is engaged to couple the engine 14 to the first motor/generator 20, the second clutch 46 is engaged to couple the third motor/generator 26 to the first motor/generator 20, and the third clutch 48 is engaged to couple the third motor/generator 26 to the front wheels 18. The mechanical power from the engine 14 can be split between being utilized to directly power the front wheels 18 and being utilized to operate the first motor/generator 20 and the third motor/generator 26 as generators to provide power to the DC bus 30, which may be utilized to recharge the RESS 12 or drive the rear wheels 16 with the second motor/generator 22. The power split mode allows the vehicle 10 to provide increased torque to the front wheels 18 or propel the vehicle 10 solely with the engine 14 (e.g., if there is a malfunction in the electrical system).

The selective coupling and decoupling of the engine 14, the first motor/generator 20, the third motor/generator 26, and the front wheels 18 with the clutches 44, 46, and 48 allows the first motor/generator 20 and the third motor/generator 26 to be utilized in tandem (e.g., both operated as motors or as generators) or to be utilized for different purposes simultaneously. When used in tandem, the first motor/generator 20 and the third motor/generator 26 can provide maximum torque to the front wheels 18 in an AWD mode or can provide maximum electrical power to the DC bus 30.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A drive system for a vehicle, the drive system comprising:
   an engine for providing power for propelling the vehicle;
   an electrical energy storage device;
   a first motor for driving a rotation of a first shaft of the vehicle;
   a second motor for driving a rotation of a second shaft of the vehicle; and
   a third motor for providing electrical power to drive a rotation of one of the first shaft and the second shaft;
   wherein the drive system is configured to operate in a first mode, wherein in the first mode, power for each of the first motor and the second motor is provided exclusively by the electrical energy storage device;
   wherein the drive system is configured to operate in a second mode, wherein in the second mode, each of the first motor, the second motor and the third motor is driven exclusively by power from the electrical energy storage system;
   wherein one of the first motor and the second motor is configured to be mechanically coupled to the engine via the third motor, and to be mechanically decoupled from a respective one of the first shaft and the second shaft in order to provide electrical power but not mechanical power to drive a rotation of a respective one of the second shaft and the first shaft.

2. A drive system for a vehicle, the drive system comprising:
   an engine for providing power for propelling the vehicle;
   an electrical energy storage device;
   a first motor for driving a rotation of a first shaft of the vehicle;
   a second motor for driving a rotation of a second shaft of the vehicle; and
   a third motor configured to be driven by the engine to provide electrical power;
   wherein the drive system is configured to operate in a first mode, wherein in the first mode, the third motor is configured to generate electricity and only one of the first shaft and the second shaft is driven by either the first motor or the second motor using the electrical power provided by the engine;
   wherein one of the first motor and the second motor is configured to be mechanically coupled to the engine via the third motor, and to be mechanically decoupled from a respective one of the first shaft and the second shaft in order to provide electrical power but not mechanical power to drive a rotation of a respective one of the second shaft and the first shaft.

3. The drive system of claim 2, wherein the drive system is configured to operate in a second mode, wherein in the second mode, the third motor is configured to generate electricity, and wherein both the first motor and the second motor are configured to be driven by the electrical power provided by the third motor to drive the rotation of the first shaft and the rotation of the second shaft.

4. The drive system of claim 2, wherein the drive system is configured to operate in a second mode, wherein in the second mode, the third motor is mechanically engaged with the first motor to drive the first shaft and the second motor drives the second shaft using the electrical power provided by the third motor.

5. A drive system for a vehicle, the drive system comprising:
   an engine for providing electrical power for propelling the vehicle;
   an electrical energy storage device;
   a first motor for driving a rotation of a first shaft of the vehicle;
   a second motor for driving a rotation of a second shaft of the vehicle; and
   a third motor configured to be driven by the engine;
   wherein the drive system is configured to operate in a first mode, wherein in the first mode, the third motor is configured to generate electricity and only one of the first shaft and the second shaft is driven by either the first motor or the second motor using the electrical power provided by the engine; and
   wherein the drive system is configured to operate in a second mode, wherein in the second mode, the first motor is mechanically coupled to the engine via the third motor and is mechanically decoupled from the first shaft in order to provide electrical power but not mechanical power to drive the second motor and thereby cause a corresponding rotation of the second shaft.

6. A vehicle comprising:
   a drive system including:
      an engine for providing power for propelling the vehicle;
      an electrical energy storage device;
      a first motor for driving a rotation of a first shaft of the vehicle;
      a second motor for driving a rotation of a second shaft of the vehicle; and
      a third motor for providing electrical power to drive a rotation of one of the first shaft and the second shaft;
      wherein the drive system is configured to operate in a first mode, wherein in the first mode, power for each of the first motor and the second motor is provided exclusively by the electrical energy storage device;
      wherein the drive system is configured to operate in a second mode, wherein in the second mode, each of the first motor, the second motor and the third motor is driven exclusively by power from the electrical energy storage system;

wherein one of the first motor and the second motor is configured to be mechanically coupled to the engine via the third motor, and to be mechanically decoupled from a respective one of the first shaft and the second shaft in order to provide electrical power but not mechanical power to drive a rotation of a respective one of the second shaft and the first shaft.

7. A vehicle comprising:

a drive system including:
- an engine for providing electrical for propelling the vehicle;
- an electrical energy storage device;
- a first motor for driving a rotation of a first shaft of the vehicle;
- a second motor for driving a rotation of a second shaft of the vehicle; and
- a third motor configured to be driven by the engine to provide electrical power;
- wherein the drive system is configured to operate in a first mode, wherein in the first mode, the third motor is configured to generate electricity and only one of the first shaft and the second shaft is driven by either the first motor or the second motor using the electrical power provided by the engine;
- wherein one of the first motor and the second motor is configured to be mechanically coupled to the engine via the third motor, and to be mechanically decoupled from a respective one of the first shaft and the second shaft in order to provide electrical power but not mechanical power to drive a rotation of a respective one of the second shaft and the first shaft.

8. The vehicle of claim 7, wherein the drive system is configured to operate in a second mode, wherein in the second mode, the third motor is configured to generate electricity, and wherein both the first motor and the second motor are configured to be driven by the electrical power provided by the third motor to drive the rotation of the first shaft and the rotation of the second shaft.

9. The vehicle of claim 7, wherein the drive system is configured to operate in a second mode, wherein in the second mode, the third motor is mechanically engaged with the first motor to drive the first shaft and the second motor drives the second shaft using the electrical power provided by the third motor.

* * * * *